(12) United States Patent
Matsumoto et al.

(10) Patent No.: US 7,863,555 B2
(45) Date of Patent: Jan. 4, 2011

(54) ILLUMINATION APPARATUS AND PROJECTION DISPLAY APPARATUS

(75) Inventors: Shinya Matsumoto, Hirakata (JP); Yoshihiro Yokote, Yokohama (JP); Makoto Maeda, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 463 days.

(21) Appl. No.: 11/955,492

(22) Filed: Dec. 13, 2007

(65) Prior Publication Data
US 2008/0143972 A1 Jun. 19, 2008

(30) Foreign Application Priority Data
Dec. 15, 2006 (JP) ............... 2006-338739
Nov. 28, 2007 (JP) ............... 2007-307320

(51) Int. Cl.
*H01J 3/14* (2006.01)
*H01J 40/14* (2006.01)
*G03B 21/26* (2006.01)

(52) U.S. Cl. .................. 250/216; 250/239; 353/94

(58) Field of Classification Search .............. 250/552, 250/553, 227.14, 227.18, 205, 216, 239; 362/555, 561; 257/81–85; 353/31, 33, 94; 385/34, 129–133
See application file for complete search history.

(56) References Cited

U.S. PATENT DOCUMENTS 7,303,288 B2* 12/2007 Miyazawa et al. ............ 353/94

FOREIGN PATENT DOCUMENTS

| JP | 10-200166 | 7/1998 |
| JP | 2000-112031 | 4/2000 |
| JP | 2001-196637 | 7/2001 |
| JP | 2004-341108 | 12/2004 |

* cited by examiner

*Primary Examiner*—Que T Le
*Assistant Examiner*—Don Williams
(74) *Attorney, Agent, or Firm*—Marvin A. Motsenbocker; Mots Law, PLLC

(57) ABSTRACT

An illumination apparatus includes; a first solid-state light source, a second solid-state light source, a first arrangement member provided with a first arrangement surface, a second arrangement member provided with a second arrangement surface, an optical unit configured to reduce a dispersion angle of a light beam. The first solid-state light source emits a light beam having a first directivity. The second solid-state light source emits a light beam having a second directivity greater than the first directivity. A distance from the second arrangement surface to the second light-entering surface is longer than a distance from the first arrangement surface to the first light-entering surface.

8 Claims, 12 Drawing Sheets

← : EMITTED RED LIGHT BEAM

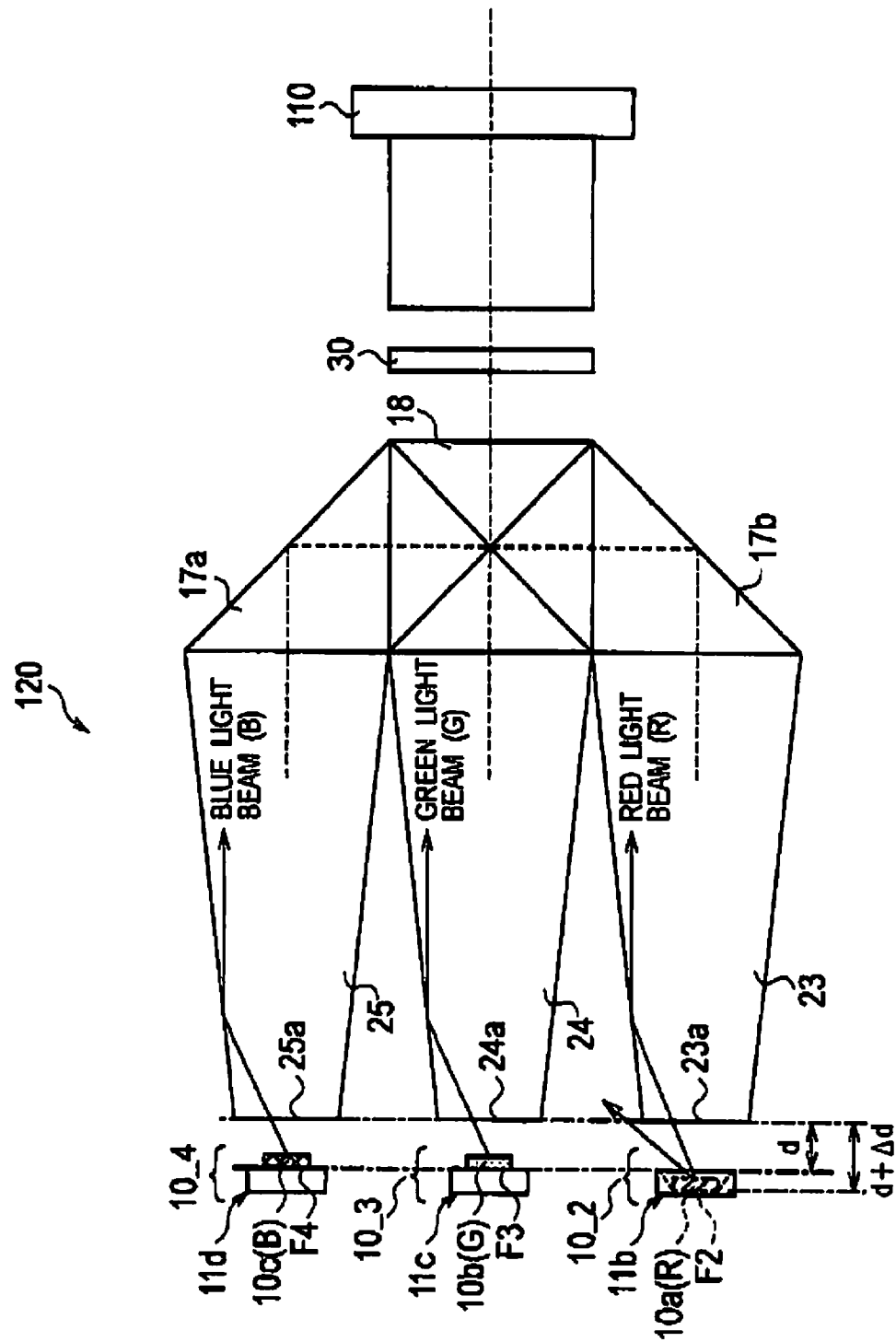

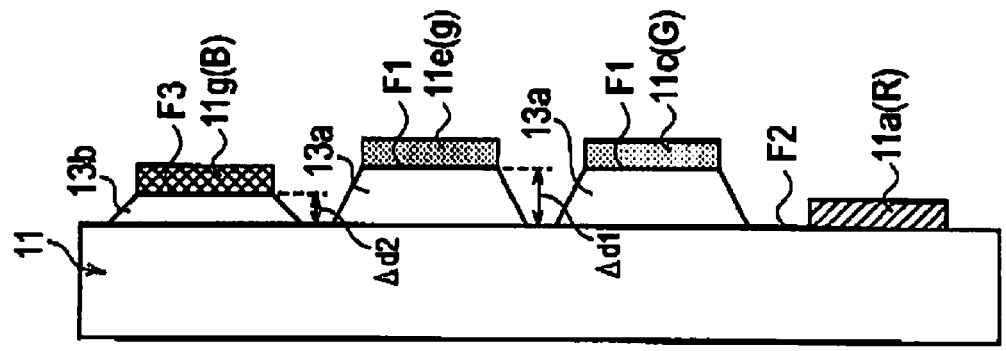
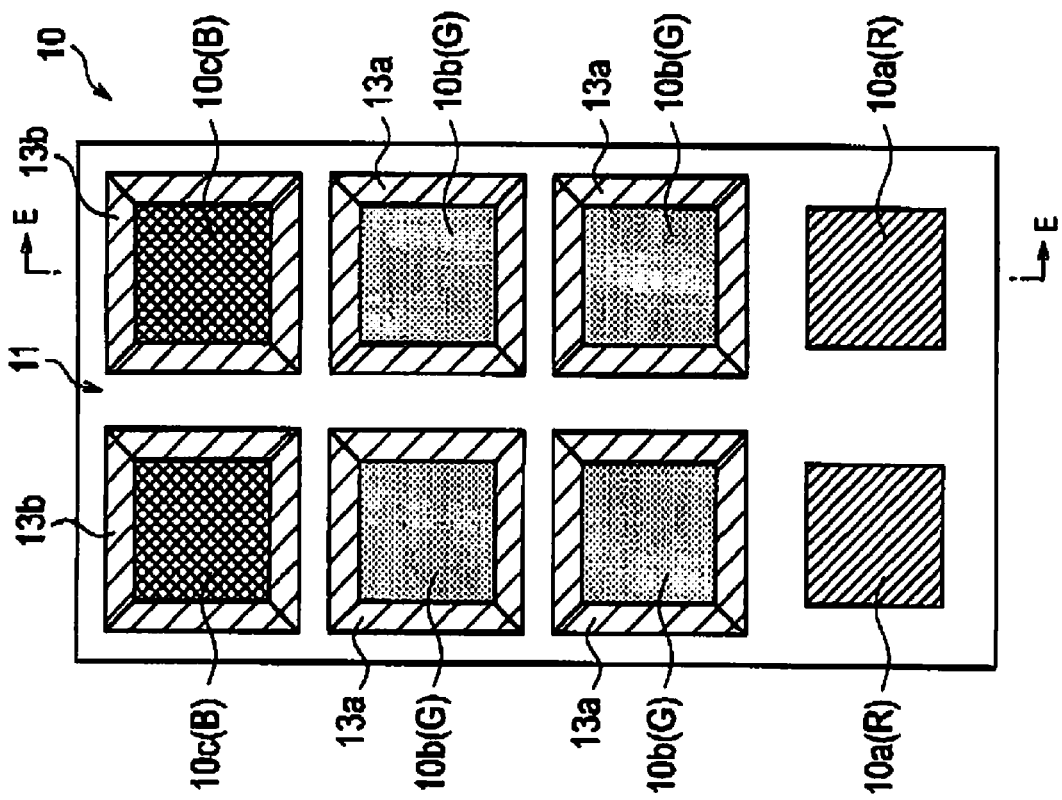

//ILLUMINATION APPARATUS AND
PROJECTION DISPLAY APPARATUS

CROSS REFERENCE TO RELATED
APPLICATIONS

This application is based upon and claims the benefit of priority from prior Japanese Patent Application No. 2006-338789, filed on Dec. 15, 2006 and Japanese Patent Application No. 2007-307820, filed on Nov. 28, 2007; the entire contents of which are incorporated herein by reference.

BACKGROUND OF THE INVENTION

1. Field of the Invention

The present invention relates to an illumination apparatus including a plurality of solid-state light sources each configured to emit a light beam having a different directivity, and an optical unit configured to reduce the dispersion angle of a light beam entering thereto, and also relates to a projection display apparatus.

2. Description of the Related Art

Conventionally, a projection display apparatus has been known, which includes a plurality of solid-state light sources each emitting a light beam of a different color, such as red, green or blue (RGB), and projects an image by use of the light beams of the respective colors emitted from the solid-state light sources (Japanese Patent Publication No. 2000-112031).

FIG. 1 shows an example of the aforementioned projection display apparatus. As shown in FIG. 1, the projection display apparatus includes: a multi-chip type light source 10 provided with a plurality of solid-state light sources; a tapered rod integrator 21 configured to lead, to a display panel 30, light beams of the respective colors emitted from the plurality of solid-state light sources; the display panel 30 configured to modulate the light beams of the respective colors entering thereto, and then to emit the modulated light beams as image light; and a projection lens unit 110 configured to project the image light onto a screen or the like.

Normally, a narrow space is provided between the light source 10 and the tapered rod integrator 21 for the purpose of avoiding the transmission of vibration, heat or the like between the two components. However, in order to avoid loss of colored light beams emitted from the light source 10, the light source 10 is preferably arranged as close to the tapered rod integrator 21 as possible in a projection display apparatus of the aforementioned configuration, in general. For this reason, the light source 10 and the tapered rod integrator 21 are arranged as close to each other as possible with a narrow space (approximately 1 mm).

Incidentally, the smaller the dispersion angle of a colored light beam emitted from a solid-state light source is, the higher the light use efficiency of the colored light beam is. Accordingly when a light emitting diode (LED) is utilized as a solid-state light source, an improvement in the directivity of a colored light beam from the solid-state light source is sought by use of a molded lens or photonic crystals.

In a case where a red LED emitting a red light beam, a green LED emitting a green light beam and a blue LED emitting a blue light beam are used as a plurality of solid-state light sources, however, it is difficult to equalize the directivities of the respective light beams emitted from the LEDs.

Specifically, AlInGaP is used as the material of the red LED emitting a red light beam while InGaN is used as the material of the green LED and blue LED respectively emitting a green light beam and blue light beam. Accordingly, the distribution of the dispersion angle of the red LED results in as shown in FIG. 2A, while the distribution of the dispersion angle of each of the green and blue LEDs results in as shown in FIG. 2B, for example. In particular, the difference between the light intensities of the red LED, and the green and blue LEDs in the dispersion angle range of 30° to 60°, and in the range of −30° and −60°, is large.

As described above, in a projection display apparatus that employs color LEDs each having a different directivity, a difference in luminance distributions (unevenness of the brightness on the illuminated surface), dispersion angle distributions (the distribution states shown in FIGS. 2A and 2B), surface dispersion angle distributions (dispersion angle distributions in the respective portions on the illuminated surface) or the like between the respective colored light beams occurs in a case where the colored light beams are led to the display panel 30 by use of optical systems having the same mechanism. For this reason, a color shading occurs in a projected image on a screen, which significantly deteriorates the quality of the image.

SUMMARY OF NE INVENTION

An illumination apparatus according to a first aspect of the invention includes: a first solid-state light source (one of a green LED 10b and a blue LED 10c) configured to emit a light beam having a first directivity; a second solid-state light source (red LED 10a) configured to emit a light beam having a second directivity greater than the first directivity; a first arrangement member (core board member 11, for example) provided with a first arrangement surface (first arrangement surface F1, for example) on which the first light source is arranged; a second arrangement member (core board member 11, for example) provided with a second arrangement surface (second arrangement surface F2, for example) on which the second light source is arranged; and an optical unit (tapered rod integrator, for example) configured to reduce the dispersion angle of the light beams emitted from the first solid-state light source and the light beams emitted from the second solid-state light source. A wave length of the light beam (one of green and blue light beams, for example) emitted from the first solid-state light source is different from a wave length of the light beam (red light beam, for example) emitted from the second solid-state light source. The optical unit of the illumination apparatus is provided with a first light-entering surface (light-entering surface 21a, for example) on which the light beam emitted from the first solid-state light source is irradiated, and a second light-entering surface (light-entering surface 21a, for example) on which the light beam emitted from the second solid-state light source is irradiated. The first arrangement surface faces the first light-entering surface, and the second arrangement surface faces the second light-entering surface. A distance from the second arrangement surface to the second light-entering surface is longer than a distance from the first arrangement surface to the first light-entering surface in the illumination apparatus.

According to the first aspect, in the illumination apparatus, the distance from the second arrangement surface on which the second solid-state light source is arranged, to the second light-entering surface of the optical unit, is longer than the distance from the first arrangement surface on which the first solid-state light source is arranged. In the case of an illumination apparatus according to a conventional technique, a portion of a light beam emitted from the second solid-state light source, the portion having a large dispersion angle, is adversely irradiated on the second light-entering surface. In contrast, in the aforementioned illumination apparatus according to the first aspect, a portion of a light beam having a second directivity emitted from the second solid-state light source, the portion having a small dispersion angle, is irradiated on the second light-entering surface of the optical unit, while a portion of the light beam, the portion having a large dispersion angle, is suppressed from being irradiated on the second light entering-surface. Specifically, the illumination apparatus can reduce the difference between the dispersion angle distribution of a light beam having the second directivity, the light beam being emitted from the second light source and then irradiated on the second light-entering surface, and the dispersion angle distribution of a light beam having the first directivity, the light beam being emitted from the first light source and then irradiated on the second light-entering surface. According to the first aspect, the illumination apparatus can suppress the occurrence of color shading in the projected image while using a plurality of solid-state light sources each having a different directivity. In this description, when a dispersion angle shown in FIG. 2A and FIG. 2B is defined as "θz," a larger absolute value "|θz|" (a value closer to "90°," for example) indicates a larger dispersion angle, and a smaller absolute value "|θz|" (a value closer to "0°," for example) indicates a smaller dispersion angle.

In the illumination apparatus of the first aspect, the second arrangement member includes a dent portion (dent portion 12) having the bottom surface as the second arrangement surface.

According to the aspect, since the second arrangement surface is provided as the bottom surface of the dent portion in the illumination apparatus, the distance from the second arrangement surface, on which the second solid-state light source is arranged, to the second light-entering surface of the optical unit can be longer than the distance from the first arrangement surface, on which the first solid-state light source is arranged, to the first light-entering surface of the optical unit. Accordingly, this aspect makes it possible to suppress, from being irradiated on the second light-entering surface, a portion of a light beam having second directivity and emitted from the second solid-state light source, the portion having a large dispersion angle. Thereby, a difference between the dispersion angle distribution of a light beam irradiated on the second light-entering surface and the dispersion angle distribution of a light beam irradiated on the first light-entering surface can be reduced. According to this aspect, the illumination apparatus can suppress the occurrence of color shading in a projected image while using a plurality of solid-state light sources each having a different directivity.

In the illumination apparatus of the first aspect, an inclined surface of the dent portion is formed of a reflection surface which reflects, to the second light-entering surface, the light beam emitted from the second solid-state light source. According to the aspect, a light beam having a large dispersion angle is also reflected by a reflection surface, and then directed at the second light-entering surface. Thereby, a reduction in the light use efficiency can be suppressed.

In the illumination apparatus of the first aspect, the arrangement member includes a base portion having the top surface as the first arrangement surface in the illumination apparatus of the aforementioned first aspect.

In the illumination apparatus of the first aspect, the optical unit is a single optical element (tapered rod integrator 21, for example) including the first light-entering surface and the second light entering surface as a same light-entering surface (light-entering surface 21a, for example), and the first arrangement member and the second arrangement member are formed as an integrated single component (core board member 11, for example). According to the aspect, the illumination apparatus can reduce a difference between the dispersion angle distribution of the light beam irradiated on the second light-entering surface and the dispersion angle distribution of the light beam irradiated on the first light-entering surface even in a case where a multi-chip light source including the first solid-state light source and the second solid-state light source arranged on a single arrangement member is employed.

In the illumination apparatus of the first aspect, the first solid-state light source and the second solid-state light source are formed of a plurality of solid-state light sources, respectively.

In the illumination apparatus of the first aspect, the optical unit is a single optical unit including the first light-entering surface and the second light-entering surfaces as a same light-entering surface. The first arrangement member includes a base portion having the top surface as the first arrangement surface. The second arrangement member includes a dent portion having the bottom surface as the second arrangement surface. The first arrangement member and the second arrangement member are arranged next to each other, so that an inclined surface of the base portion forms an inclined surface of the dent portion. The inclined surface of the base portion is formed of a reflection surface which reflects, towards the second light-entering surface, the light beam emitted from the second solid-state light source.

According to a second aspect of the invention, a projection display apparatus (a projection display apparatus 100) includes: the illumination apparatus according to above-described aspects; a light valve (display panel 30, for example) configured to modulate a light beam irradiated from the illumination apparatus; and a projection lens (projection lens unit 110, for example) configured to project, onto a screen, the light beam modulated by the light valve.

BRIEF DESCRIPTION OF THE DRAWINGS

FIG. 12 is a diagram showing a schematic configuration of a projection display apparatus 100 including an illumination apparatus 120 according to a fourth embodiment.

FIG. 14A is a front view showing a configuration of a light source 10 according to a sixth embodiment. FIG. 14B is a side view showing the configuration of the light source 10 according to the sixth embodiment.

DETAILED DESCRIPTION OF THE EMBODIMENTS

Figure 1:
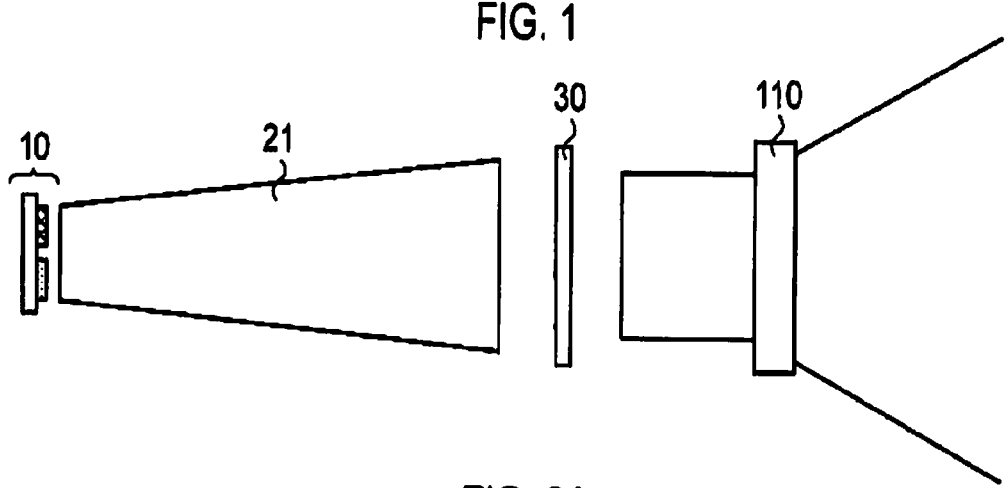
FIG. 1 is a diagram showing a schematic configuration of a projection display apparatus 100 according to a conventional technique.

Embodiments of the present invention will be described. In the description of the drawings, same or similar reference numerals are given to denote same or similar portions. It should be noted that the drawings are merely schematically shown and proportions of sizes and the like are different from actual ones. Accordingly, specific sizes and the like should be judged by referring to the description below. Furthermore, as a matter of course, there are included portions where relationships or proportions of sizes of the drawings are different with respect to one another.

First Embodiment

Figure 3:
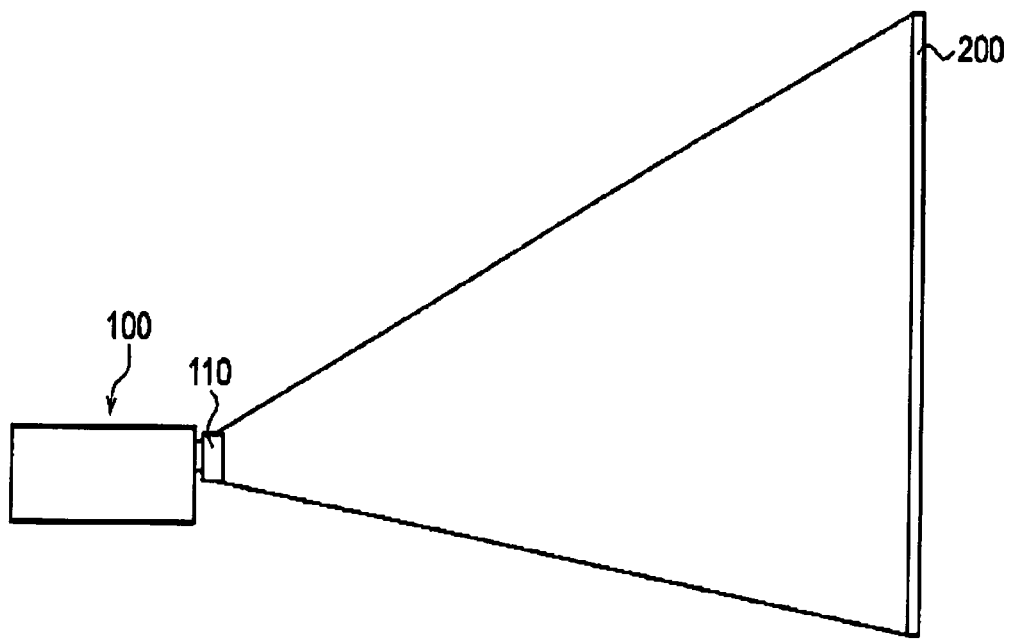
FIG. 3 is a diagram showing an overall schematic configuration of a projection display apparatus 100 according to a first embodiment.

Overview of Projection Display Apparatus According to First Embodiment of the Present Invention A description will be given of an overview of a projection display apparatus according to a first embodiment of the present invention with reference to FIG. 3. As shown in FIG. 3, a projection display apparatus 100 according to the first embodiment includes a projection lens unit 110, and projects image light enlarged by the projection lens unit 110 on a screen 200. Specifically, the projection display apparatus 100 projects the image light on the screen 200 by use of a red light beam (R), a green light beam (G) and a blue light beam (B).

Schematic Configuration of Illumination Apparatus

Figure 4:
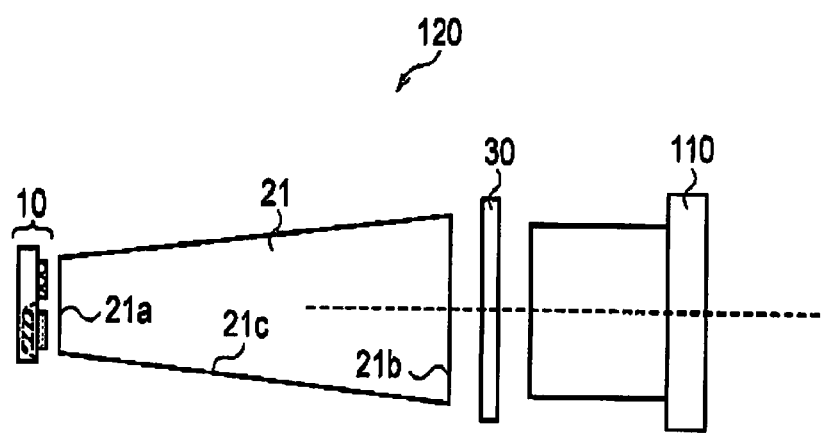
FIG. 4 is a diagram showing a schematic configuration of the projection display apparatus 100 including an illumination apparatus 120 according to the first embodiment.

Next, by referring to FIG. 4, a description will be given of an illumination apparatus 120 included in the projection display apparatus 100. FIG. 4 shows a schematic configuration of the projection display apparatus 100. As shown in FIG. 4, the projection display apparatus 100 includes a light source 10, a tapered rod integrator 21, a display panel 30 and the projection lens unit 110.

Here, the illumination apparatus 120 according to this embodiment is configured by including the light source 10 and the tapered rod integrator 21. It should be noted that the display panel 30 and the projection lens unit 110 are not included in the illumination apparatus 120 although the components are shown in FIG. 4.

The light source 10 includes a plurality of solid-state light sources each emitting a light beam of different color. Specifically, the light source 10 includes a red light emitting diode (LED) 10a emitting a red light beam, a green LED 10b emitting a green light beam and a blue LED 10c emitting a blue light beam. To be more specific, the optical wave length of light emitted from the green LED 10b and the blue LED 10c of the light source 10 and the optical wave length of light emitted from the red LED 10a of the same are different. The light source 10 irradiates the light beams of the respective colors emitted from the LEDs to the tapered rod integrator 21.

The tapered rod integrator 21 includes a light-entering surface 21a, a reflection surface 21c including a tapered portion, and a light-emitting surface 21b. Moreover, the tapered rod integrator 21 reduces the dispersion angles of green and blue light beams respectively emitted from the green LED and the blue LED and the dispersion angle of a red light beam emitted from the red LED. Specifically, the tapered rod integrator 21 allows the light beams of the respective colors to enter the light-entering surface 21a. Then, the tapered rod integrator 21 reduces the dispersion angle of each of the light beams of the respective colors emitted from the light source 10, by causing the entered light beams of the respective colors to be reflected by the reflection surface 21c, and also emits the light beams of the colors towards the display panel 30. The tapered rod integrator 21 may be a single component formed of a tapered rod integrator provided with a lens.

Furthermore, the light-entering surface 21a of the tapered rod integrator 21 constitutes a light-entering surface (first light-entering surface) on which the green and blue light beams respectively emitted from the green LED 10b and the blue LED 10c are irradiated, and a light-entering surface (second light-entering surface) on which the red light beam emitted from the red LED 10a is irradiated. In other words, the tapered rod integrator 21 according to the present embodiment is provided with a single integrated light-entering surface, as the light-entering surface 21a, including a light-entering surface on which the green light and the blue light are irradiated and the light-entering surface on which the red light beam is irradiated. It should be noted that the tapered rod integrator 21 constitutes an optical unit in this embodiment.

The display panel 30 is a transmissive display panel, such as a liquid crystal display panel. In addition, the display panel 30 modulates the red light beam, the green light beam and the blue light beam emitted from the tapered rod integrator 21, and then emits the light beams as image light to the projection lens unit 110. In this embodiment, the display panel 30 constitutes a light valve configured to modulate the light beams of the respective colors.

The projection lens 110 projects the image light modulated by the display panel 30 onto the screen 200.

Schematic Configuration of Light Source

Figure 5B:
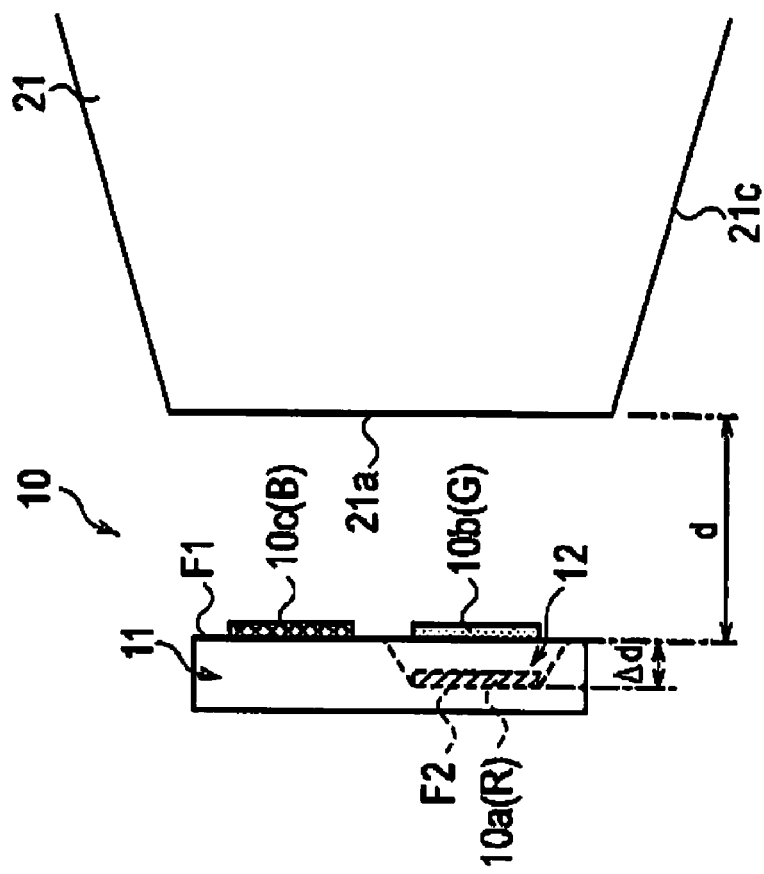
FIG. 5B is a side view showing the schematic configuration of the light source 10 according to the first embodiment.
Figure 5A:
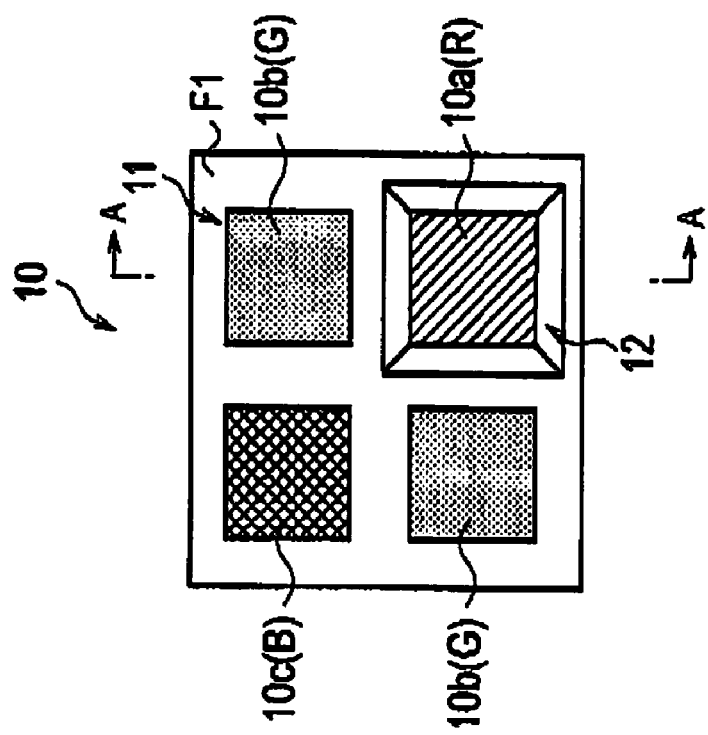
FIG. 5A is a front view showing a schematic configuration of a light source 10 according to the first embodiment.

Next, a description will be specifically given of a configuration of the light source 10 according to the present embodiment. FIG. 5A is a front view of the light source 10 according to the present embodiment, the light source 10 being viewed from the tapered rod integrator 21 side. FIG. 5B shows a side view of the light source 10. Hereinafter, the description will be given with assumptions that the light emission direction (optical axis direction) from the light source 10 is the horizontal direction, and that the direction in parallel with the light-entering surface 21a of the tapered rod integrator 21 is the vertical direction. It should be noted that the horizontal direction and the vertical direction are orthogonal to each other.

As shown in FIGS. 5A and 5B, the light source 10 includes a core board member 11, the red LED 10a emitting a red light beam, the green LED 10b emitting a green light beam and the blue LED 10c emitting a blue light beam.

Figure 2A:
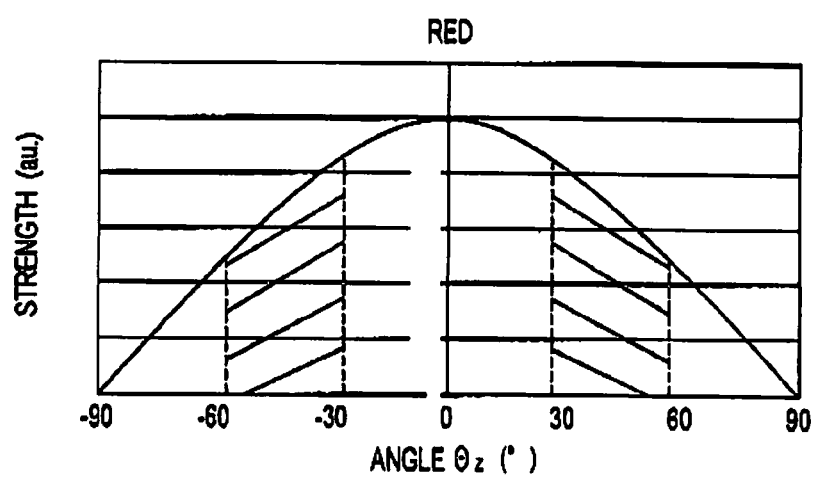
FIG. 2A is a graph showing the dispersion angle distribution of a red LED.
Figure 2B:
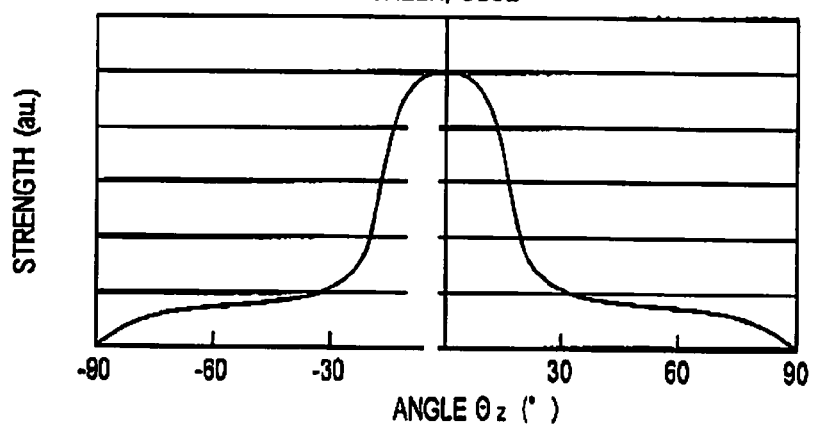
FIG. 2B is a graph showing the dispersion angle distribution of a green LED and a blue LED.

Here, assumptions are made in this embodiment that the red light beam emitted from the red LED 10a has such a dispersion angle distribution shown in FIG. 2A, and that each of the green and blue light beams emitted from the green LED 10b and the blue LED 10c has such a dispersion angle distribution shown in FIG. 2B. Specifically, the directivity of the red light beam emitted from the red LED 10a is greater than those of the green light and the blue light beams respectively emitted from the green LED 10b and the blue LED 10c in this embodiment.

It should be noted that the green LED 10b and the blue LED 10c constitute a first solid-state light source that emits a light beam having a first directivity in this embodiment. Moreover, the red LED 10a constitutes a second solid-state light source that emits a light beam having a second directivity that is a directivity greater than those of the light beams emitted respectively from the green LED 10b and the blue LED 10c.

The core board member 11 includes an arrangement surface F1 (first arrangement surface) including the green LED 10b and the blue LED 10c arranged thereon, and an arrangement surface F2 (second arrangement surface) including the red LED 10a arranged thereon. In addition, the arrangement surfaces F1 and F2 are arranged on the core board member 11 so as to face the light-entering surface 21a of the tapered rod integrator 21.

In addition, the core board member 11 includes a reference surface arranged at a position apart from the light-entering surface 21a by a predetermined distance, and a dent portion 12 provided on the reference surface. It should be noted that the aforementioned reference surface is the same surface as the arrangement surface F1 including the green LED 10b and the blue LED 10c arranged thereon in this embodiment.

Specifically, as shown in FIG. 5B, the core board member 11 includes, on the arrangement surface F1, the dent portion 12 that is an area dented in a direction opposite from the light-entering surface 21a. In addition, the arrangement surface F2 including the red LED 10a arranged thereon is provided on the bottom surface of the dent portion 12. Specifically, the core board member 11 is configured so that the distance between the arrangement surface F2 and the light-entering surface 21a can be longer than a distance "d" in the horizontal direction between the arrangement surface F1 and the light-entering surface 21a by the amount of distance "Δd" representing the length of the dent portion 12 in the horizontal direction.

In addition, the core member 11 constitutes a first arrangement member provided with the arrangement surface F1 including the green LED 10b and the blue LED 10c arranged thereon in this embodiment. Moreover, the core member 11 constitutes a second arrangement member provided with the second arrangement surface F2 including the red LED 10a arranged thereon in this embodiment. Specifically, the first and second arrangement members are formed as an integrated single member, which is the core member 11.

Distance of Solid-State Light Source

Figure 6:
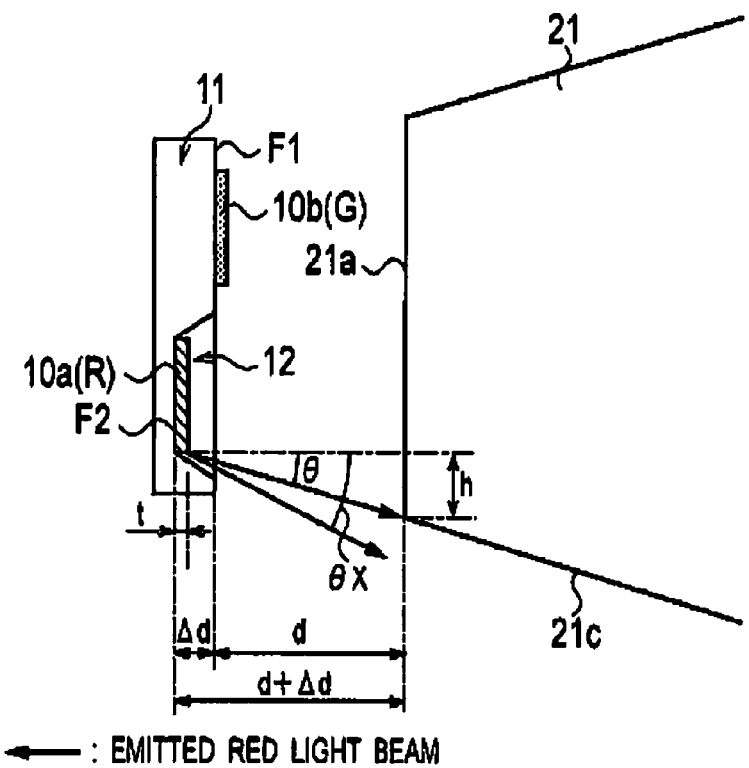
FIG. 6 is a diagram showing the relationship of the distances between the light 10 and a tapered rod integrator 21 according to the first embodiment.

Next, a description will be given of a relationship of the distance between the arrangement surface F1 and the light-entering surface 21a and the distance between the arrangement surface F2 and the light-entering surface 21a. FIG. 6 shows a cross-sectional view taken along the line A-A in the front view shown in FIG. 5A, and the tapered rod integrator 21.

Here, as shown in FIG. 6, consider a case where: the thickness of the red LED 10a is denoted by "t", the distance indicating the difference in the vertical direction between the position of the edge of the reflection surface 21c and the position of the lower edge of the red LED 10a is denoted by "h;" the distance in the horizontal direction between the light-entering surface 21a and the arrangement surface F1 is denoted by "d;" and the maximum degree of a dispersion angle of a portion of the red light beam emitted from the red LED 10a, the portion being desired to be irradiated on the light-entering surface 21a is denoted by "θ." The distance "d+Δd" between the light-entering surface 21a and the arrangement surface F2 in the horizontal direction is calculated by the following formula (1).

$$d+\Delta d = (h/\tan\theta) + t \quad (1)$$

Consider a case where: the thickness "t" of the red LED 10a is "0.5 mm;" the distance "d" between the light-entering surface 21a and the arrangement surface F1 is "2 mm;" the height "h" is "2 mm;" and a portion of the red light beam emitted from the red LED 10a, the portion having the dispersion angle "θ" not greater than 30°, is desired to be irradiated on the light-entering surface 21a, for example. In this case, the distance "d+Δd" between the light-entering surface 21a and the arrangement surface F2 is "3.96 mm."

As described above, in the illumination apparatus 120, the arrangement surface F2 is provided at a position apart from the light-entering surface 21a by the amount of distance "d+Δd" calculated by use of the formula (1), and then, the red LED 10a is arranged on the arrangement surface F2. Thereby, as shown in FIG. 6, a portion of the red light beam having a dispersion angle "θX" greater than the dispersion angle "θ" is no longer irradiated on the light-entering surface 21a.

Figure 7A:
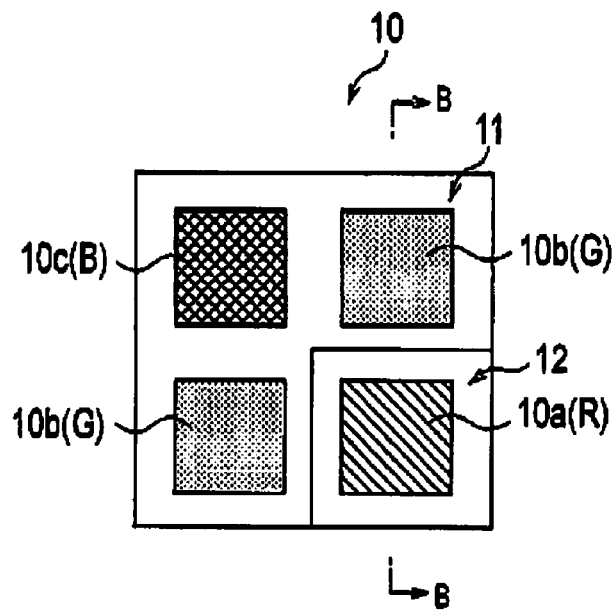
FIG. 7A is a front view showing a different configuration example of the light source 10 according to the first embodiment.
Figure 7B:
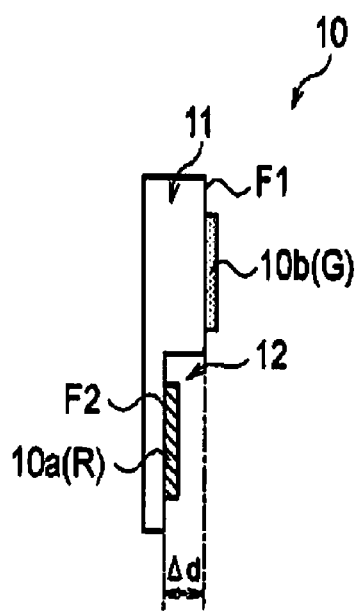
FIG. 7B is a side view showing the different configuration of the light source 10 according to the first embodiment.

It should be noted that the dent portion 12 may be formed in a different shape. The dent portion 12, for example, may be formed by removing a part of the arrangement surface F1 to form a dent portion as shown in the front view of FIG. 7A and the cross-sectional view of FIG. 7B (cross-sectional view taken along the line B-B of FIG. 7A). Furthermore, the dent portion 12 is not limited to be of a square shape. The dent portion 12 may be formed in a circular dent shape (not shown) by forming a circular dent portion.

Effects and Advantages

According to the projection display apparatus 100 of the present embodiment, the distance between the arrangement surface F2 including the red LED 10a arranged thereon and the light-entering surface 21a of the tapered rod integrator 21 is longer than the distance between the arrangement surface F1 including the green LED 10b and the blue LED 10c arranged thereon, and the light-entering surface 21a.

A portion of the red light beam having a large dispersion angle is adversely irradiated on the light-entering surface 21a in the case of an illumination apparatus according to a conventional technique. In the case of the aforementioned illumination apparatus 120a, however, a portion of the red light beam emitted from the red LED 10a, having a large dispersion angle is suppressed from being irradiated on the light-entering surface 21a, and a portion of the red light beam having a small dispersion angle is irradiated on the light-entering surface 21a. Specifically, in the illumination apparatus 120, the light beams of the respective colors emitted from the red LED 10a, the green LED 10b and the blue LED 10c enter the light-entering surface 21a of the tapered rod integrator 21 while the difference between the dispersion angle distribution of the red light beam emitted from the red LED 10a and the dispersion angle distribution of the green LED 10b and the blue LED 10c is reduced. Then, the tapered rod integrator 21 in the illumination apparatus 120 irradiates, on the display panel 30, the light beams of the respective colors in which the difference between the dispersion angle distributions is reduced.

Accordingly, in the case of the projection display apparatus 100 of the present embodiment, the occurrence of color shading in the projected image can be suppressed while a plurality of solid-state light sources (the red LED 10a, green LED 10b and blue LED 10c) having different directivities are used.

In addition, according to the projection display apparatus 100, the illumination apparatus 120 is provided with the arrangement surface F1 including the green LED 10b and the blue LED 10c arranged thereon, and the arrangement surface F2 including the red LED 10a arranged thereon at the bottom surface of the dent portion 12 provided on the arrangement surface F1. Accordingly, even in a case where the illumination apparatus 120 employs a multi-chip light source including the green LED 10b, the blue LED 10c and the red LED 10a arranged on a single unit of the core member 11, the difference between the dispersion angle distribution of the red light beam irradiated on the light-entering surface 21a and the dispersion angle distribution of the green light beam and the blue light beam irradiated on the light-entering surface 21a can be reduced.

Second Embodiment

Figure 8A:
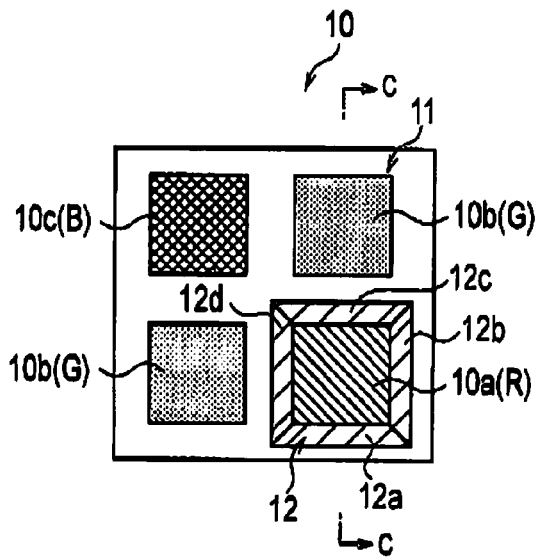
FIG. 8A is a front view showing a configuration of a light source 10 according to a second embodiment.
Figure 8B:
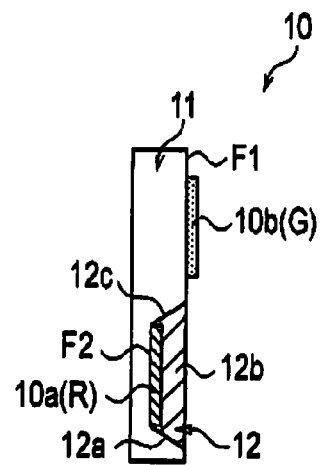
FIG. 8B is a side view showing the configuration of the light source 10 according to the second embodiment.

A description will be given of an overview of an illumination apparatus 120 according to a second embodiment of the present invention while a difference from the first embodiment is in focus. FIG. 8A shows a front view of a light source 10 according to the present embodiment, the light source 10 being viewed from the tapered rod integrator 21 side. FIG. 8B shows a cross-sectional view taken along the line C-C of the front view shown in FIG. 8A.

As shown in FIGS. 8A and 8B, the dent portion 12 in the light source 10 according to the present embodiment further includes reflection surfaces 12a to 12d on the respective side walls each extending from the bottom surface to the arrangement surface F1 (the reference surface). Each of the reflection surfaces 12a to 12d reflects, to the light-entering surface 21a, the red light emitted from the red LED 10a.

Red Light Beam Reflected by Reflection Surface

Figure 9:
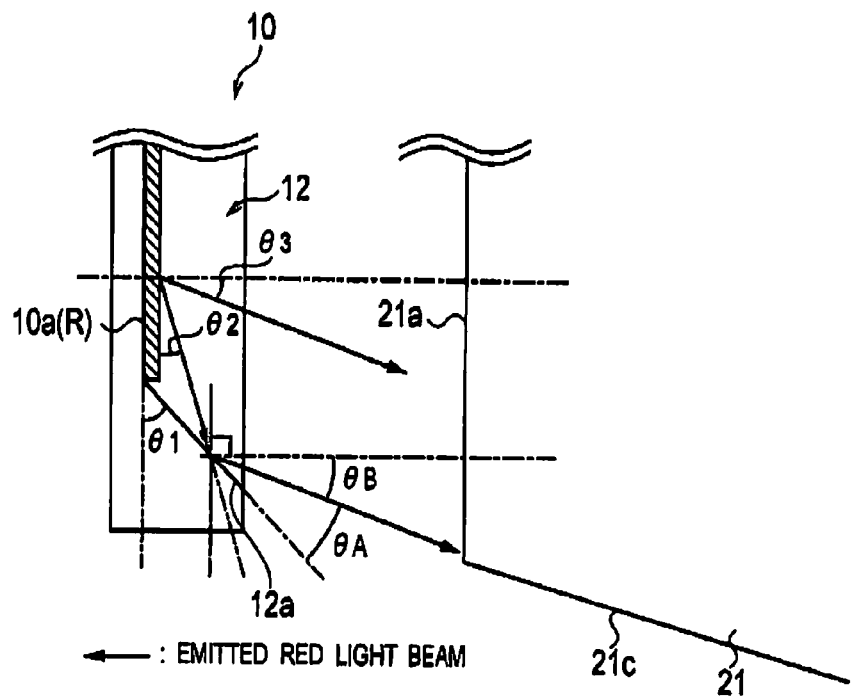
FIG. 9 is a diagram showing the angle of a reflection surface included in the light source 10 according to the second embodiment.

Next, a description will be given as to the red light beam reflected by the aforementioned reflection surfaces 12a to 12b while the reflection surface 12a is in focus. FIG. 9 shows a cross-sectional view of the red LED 10a, the reflection surface 12a and the tapered rod integrator 21.

Here, as shown in FIG. 9, assumptions are made that the inclination angle of the reflection surface 12a provided on the corresponding side wall is "θ1," the angle of the red light beam emitted from the red light LED 10a with respect to the light-emitting surface is "θ2," and the dispersion angle of the red light beam desired to be irradiated on the light-entering surface 21a is "θ3." It should be noted that a portion of a red light beam in the range of the angle "θ2" with respect to the light-emitting surface is the portion of a red light beam not directly irradiated on the light-entering surface 21a. In addition, the angle "θA" of the red light beam reflected by the reflection surface 12a with respect to the reflection surface 12a is calculated by the following formula (2). Here, an assumption is made that the angle "θ2" is smaller the angle "θ1."

$$\theta A = \theta 1 - \theta 2 \quad (2)$$

Furthermore, the light-entering angle "θB," with respect to the light-entering surface 21a, of the red light beam reflected by the reflection surface 12a is calculated by the following formula (8).

$$\theta B = |90° \theta 1 - \theta A| = |90° - 2*\theta 1 + \theta 2| \quad (3)$$

Assuming that the dispersion angle of the portion of a red light beam desired to be irradiated on the light-entering surface 21a is a portion of the red light beam in the range of "θ3," the light-entering angle "θB" is preferably not greater than "θ3" as shown in the formula (4).

$$|\theta B| \leq |\theta 3| \quad (4)$$

Assume that the inclination angle "θ1" of the reflection surface 12a is 45°, for example. In this case, according to the formula (3), in the illumination apparatus 120, the portion of the red light beam emitted from the light-emitting surface of the red LED 10a in the range of the angle "θ2," from 0° to 30°, is reflected by the reflection surface 12a according to the formula (3), and the portion of the red light beam thus can be irradiated on the light-entering surface 21a as the portion of the red light beam in the range of the angle "θB," from 0° to 30°.

The portion of a red light beam in the range of the angle "θ2," from 0° to 30°, with respect to the light-emitting surface is the portion of a red light beam in the range of 60° to 90° or −60° to −90° of the dispersion angle. Accordingly, in a case where the red LED 10a is provided apart from the light-entering surface 21a so that a portion of the red light beam in the range of the dispersion angle "θ3" can be irradiated on the light-entering surface 21a, a portion of the red light beam in the range of the angle "θ2" from the light-emitting surface 21a is the portion of the red light beam not irradiated on the light-entering surface 21a. This portion of the red light beam not irradiated on the light-entering surface 21a, however, can be irradiated on the light-entering surface 21a as a portion of the red light beam within the range of the dispersion angle "θ3" by causing the portion of the red light beam to be reflected by the reflection surface 12a.

It should be noted that the inclination angle "θ1" of the reflection surface 12a is not limited to "45°." The degree of the inclination angle can be set in accordance with the light-entering angle "θB" of the portion of a red light beam desired to be irradiated on the light-entering surface 21a.

Effects and Advantages

According to the projection display apparatus 100 of the present embodiment, the illumination apparatus 120 irradiates, on the light-entering surface 21a of the tapered rod integrator 21, a red light beam having a large dispersion angle, by causing the red light beam to be reflected at the reflection surfaces 12a to 12d. Accordingly, a reduction in the use efficiency of a red light beam can be suppressed. Moreover, in the illumination apparatus 120, by causing a red light beam being emitted from the red LED 10a and having a large dispersion angle to be reflected by the reflection surface 12a, the light-entering angle of the red light beam can be made closer to the light-entering angle of a red light beam having a smaller dispersion angle (to be directly irradiated on the light-entering surface 21a), and hence can be irradiated on the light-entering surface 12a.

Third Embodiment

A description will be given of a projection display apparatus 100 according to the third embodiment of the present invention while a difference from the first embodiment is in focus. In the projection display apparatus 100 according to the first embodiment, the illumination apparatus 120 is configured so that the red LED 10a, the green LED 10b and the blue LED 10c can be arranged on the same core board member 11. The illumination apparatus 120 according to the third embodiment is configured so that the red LED 10a can be arranged on a different core board member from a core board member on which the green LED 10b and the blue LED 10c are arranged.

Figure 10:
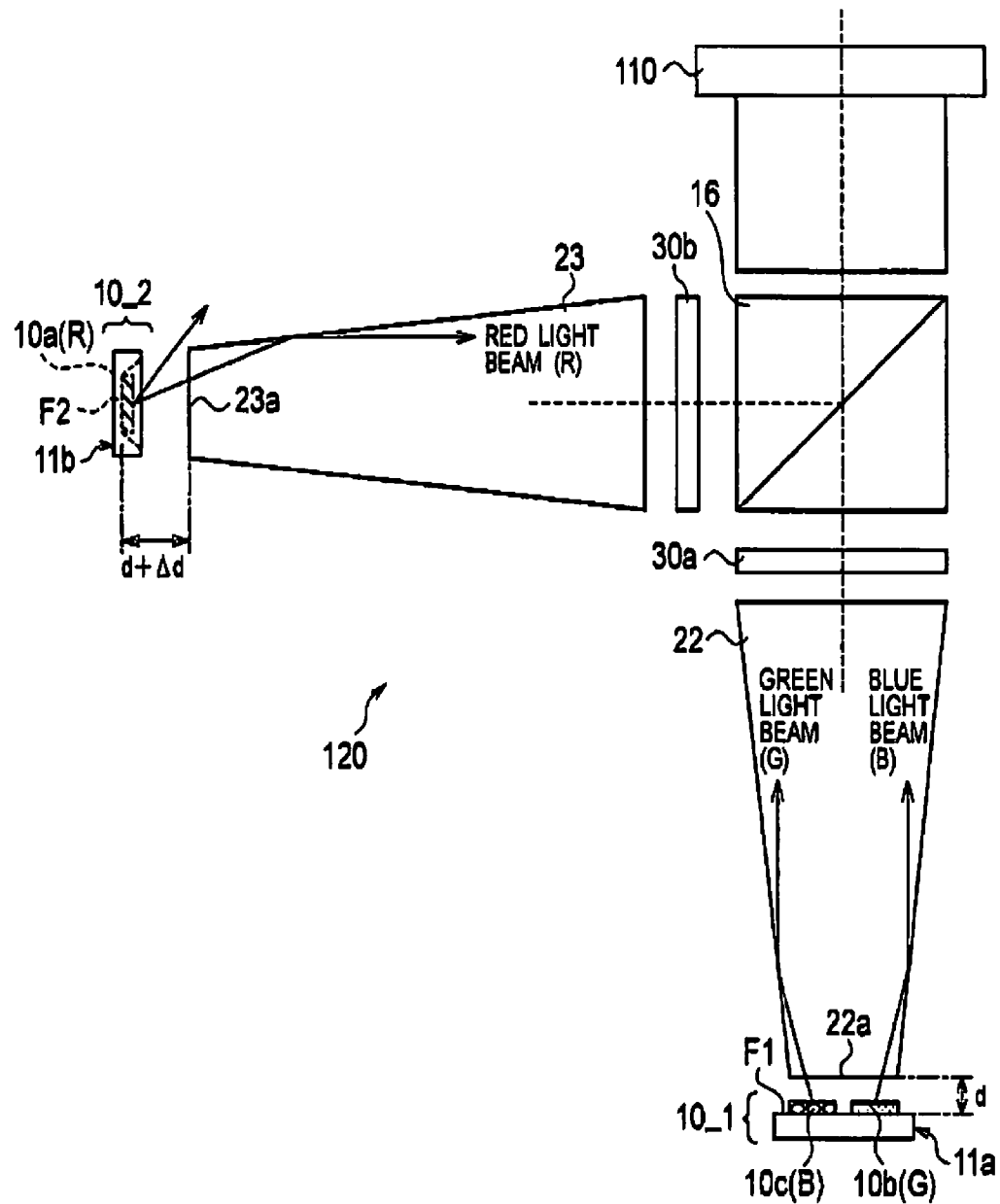
FIG. 10 is diagram showing a schematic configuration of a projection display apparatus 100 including an illumination apparatus 120 according to a third embodiment.

In FIG. 10, an overview of the projection display apparatus 100 according to the third embodiment is shown. As shown in FIG. 10, the projection display apparatus 100 according to the present embodiment includes light sources 10_1 and 10_2, tapered rod integrators 22 and 23, display panels 30a and 30b, a dichroic prism 16 and a projection lens unit 110.

Here, the illumination apparatus 120 according to the present embodiment is configured by including the light sources 10_1 and 10_2 and the tapered rod integrators 22 and 23. It should be noted that, although the display panels 30a and 30b, the dichroic prism 16 and the projection lens unit 110 are shown in FIG. 10, these components are not included in the illumination apparatus 120.

The light source 10_1 includes a core board member 11a (first arrangement member) provided with an arrangement surface F1 first arrangement surface) on which the green LED 10b and the blue LED 10c are to be arranged. In addition, the arrangement surface F1 of the core board member 11a is arranged on the light source 10_1 so as to face a light-entering surface 22a (to be described later) of the tapered rod integrator 22.

The light source 10_2 includes a core board member 11b (second arrangement member) provided with an arrangement surface F2 (second arrangement surface) on which the red LED 10a is to be arranged. In addition, the arrangement surface F2 of the core board member 11b is arranged on the light source 10_2 so as to face a light-entering surface 23a (to be described later) of the tapered rod integrator 23.

The tapered rod integrator 22 includes the light-entering surface 22a (first light-entering surface) by which a green light beam and a blue light beam respectively emitted from the green LED 10b and the blue LED 10c are reflected. In addition, the tapered rod integrator 22 reduces the dispersion angles of the green light beam and the blue light beam, and then emits the light beams to the display panel 30a.

The tapered rod integrator 23 includes the light-entering surface 23a (second light-entering surface) by which a red light beam emitted from the red LED 10a is reflected. In addition, the tapered rod integrator 23 reduces the dispersion angle of the red light beam, and then emits the light beam to the display panel 30b. It should be noted that the tapered rod integrators 22 and 23 have the same configuration with respect to the sizes of the light-entering surfaces and the light-emitting surfaces, the angles, and the like. In addition, the tapered rod integrators 22 and 23 constitute an optical unit in the present embodiment.

The display panels 30a to 30b are transmissive display panels, such as liquid crystal panels. The display panel 30a modulates a green light beam and a blue light beam emitted from the tapered rod integrator 22, and emits the light beams, as image light, to the dichroic prism 16. In addition, the display panel 30b modulates a red light beam emitted from the tapered rod integrator 23, and emits the light beam, as image light, to the dichroic prism 16.

The dichroic prism 16 includes a dichroic surface that reflects a red light beam, and that transmits a green light beam and a blue light beam. In addition, the dichroic prism 16 leads the image light modulated by the display panels 30a and 30b, to the projection lens unit 110. The projection lens unit 110 projects the image light led by the dichroic prism 16 onto the screen 200. Note that, a pair of polarization plate (not shown) is provided on the light-entering side and light emitting side of the display panel 30.

Configuration of Light Source

Next, a configuration of the light source 10_2 will be specifically described. According to the configuration of the light source 10_2, the distance from the arrangement surface F2 including the red LED 10a arranged thereon to the light-entering surface 23a is longer, by the amount of distance "Δd," than a distance "d" from the arrangement surface F1 including the green LED 10b and the blue LED 10c arranged thereon to the light-entering surface 22a.

Figure 11:
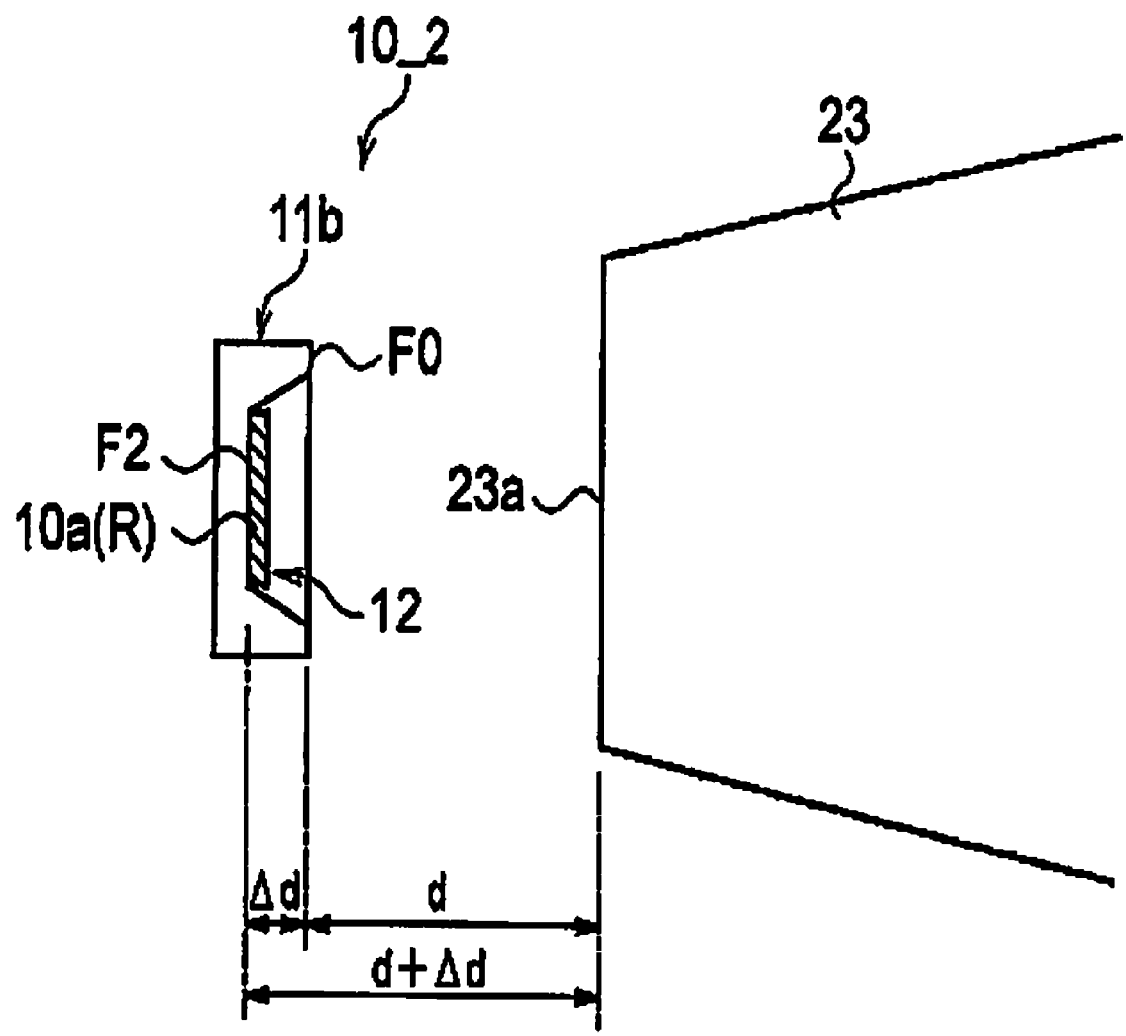
FIG. 11 is a diagram showing the relationship of the distances between a light source 10 of a different configuration example and a tapered rod integrator 21 according to the third embodiment.

Specifically, as shown in FIG. 11, the core board member 11b in the light source 10_2 includes a reference surface F0 provided at a position apart from the light-entering surface 23a by a predetermined amount of distance in a horizontal direction, and a dent portion 12 provided on the reference surface F0.

Here, the predetermined distance from the reference surface F0 to the light-entering surface 23a is equal to the distance "d" from the arrangement surface F1 including the green LED 10b and the blue LED 10c arranged thereon to the light-entering surface 22a. In addition, the core board member 11b includes the arrangement surface F2 provided on the bottom surface of the dent portion 12, the arrangement surface F2 including the red LED 10a arranged thereon.

Specifically, as shown in FIG. 11, the core board member 11b is configured so that the distance from the arrangement surface F2, on which the red LED 10a is arranged, to the light-entering surface 23a can be longer than the distance "d" in the horizontal direction from the arrangement surface F1, on which the green LED 10b and the blue LED 10c are arranged, to the light-entering surface 22a by the amount of distance "Δd" equal to the distance indicating the depth of the dent portion of the core member 11b. It should be noted that the distance "Δd" is calculated on the basis of the aforementioned formula (1).

Effects and Advantages

According to the projection display apparatus 100 of the present embodiment, the core member 11b in the illumination apparatus 120 is configured so that the distance from the arrangement surface F2, on which the red LED 10a is arranged, to the light-entering surface 23a can be longer than the distance "d" from the arrangement surface F1, on which the green LED 10b and the blue LED 10c are arranged, to the light-entering surface 22a by the amount of distance "Δd."

Thereby, the illumination apparatus 120 suppresses a portion of a red light beam emitted from the red LED 10a, the portion having a large dispersion angle, from entering the light-entering surface 23a. Specifically, in the illumination apparatus 120, a difference between the dispersion angle distribution of the red light beam, emitted from the red LED 10a, and the dispersion angle distributions of the green light beam and the blue light beam, respectively emitted from the green light LED 10b and the blue light LED 10c, is reduced. Then, the red light beam enters the light-entering surface 23a of the tapered rod integrator 23, and the green and blue light beams enter the light-entering surface 22a of the tapered rod integrator 22. Then, in the illumination apparatus 120, the tapered rod integrators 22 and 23 irradiate, on the display panels 30a and 30b respectively, the light beams of the respective colors in which the difference between the divergent angle distributions is reduced.

According to the projection display apparatus 100, the occurrence of color shading in the projected image can be suppressed while a plurality of solid-state light sources (red LED 10a, green LED 10b and blue LED 10c) having different directivities are used.

Modification Example

A modification example of the aforementioned third embodiment will be described. In the aforementioned third embodiment, the dent portion 12 may be configured so that the reflection surfaces 12a to 12d each reflecting a portion of a red light beam emitted from the red LED 10a to the light-entering surface 23a can be provided respectively on side walls each extending from the bottom surface of the dent portion 12 to the reference surface F0 as shown in the second embodiment.

According to the projection display apparatus 100 of the present embodiment, the illumination apparatus 120 causes the portion of a red light beam having a large dispersion angle to be reflected by the reflective surfaces 12a to 12d, and irradiates the portion of the red light beam on the light-entering surface 23a of the tapered rod integrator 23. Accordingly, a reduction in the use efficiency of the red light beam can be suppressed.

Fourth Embodiment

A description will be given of a projection display apparatus 100 according to a fourth embodiment of the present invention while a difference between the fourth embodiment and the first to the third embodiments is in focus. In the projection display apparatus 100 of the first embodiment, the illumination apparatus 120 is configured 80 that the red LED 10a, the green LED 10b and the blue LED 10c can be arranged on the same core board member 11. An illumination apparatus 120 of the present embodiment, however, is configured so that the red LED 10a, the green LED 10b and the blue LED 10c can be arranged on different arrangement members, respectively.

In FIG. 12, a schematic configuration of the projection display apparatus 100 according to the present embodiment is shown. The projection display apparatus 100 according to the present embodiment is configured by including light sources 10_2 to 10_4, tapered rod integrators 23 to 25, reflection mirrors 17a and 17b, a cross dichroic prism 18, a display panel 30 and a projection lens unit 110.

Here, the illumination apparatus 120 according to the present embodiment is configured by including the light sources 10_2 to 10_4 and the tapered rod integrators 23 to 25.

It should be noted that although the reflection mirrors 17a and 17b, the cross dichroic prism 18, the display panel 30 and the projection lens unit 110 are shown in FIG. 12, these components are not included in the illumination apparatus 120.

The description of the light source 10_2 is omitted here since the configuration of the light source 10_2 is same as that of the light source 10_2 according to the second embodiment.

The light source 10_3 includes a core board member 11c (first arrangement member) provided with an arrangement surface F3 (first arrangement surface) including the green LED 10b arranged thereon. In addition, the light source 10_3 is arranged in a manner that the arrangement surface F3 of the core board member 11c faces a light-entering surface 24a (to be described later) of the tapered rod integrator 24.

The light source 10_4 includes a core board member 11d (first arrangement member) provided with an arrangement surface F4 (first arrangement surface) including the blue LED 10c arranged thereon. In addition, the light source 10_4 is arranged in a manner that the arrangement surface F4 of the core board member 11d faces a light-entering surface 25a (to be described later) of the tapered rod integrator 25.

It should be noted that the distance from the arrangement surface F3 including the green LED 10b arranged thereon to the light-entering surface 24a, and the distance from the arrangement surface F4 including the blue LED 10c arranged thereon to the light-entering surface 25a, are the same, both being denoted by a reference numeral "d." In addition, the distance from the arrangement surface F2 including the red LED 10a arranged thereon to the light-entering surface 23a is longer than the distance from the arrangement surface F3 (or F4) to the light-entering surface 24a (or 25a) by the amount of distance "Δd."

The tapered rod integrator 23 includes a light-entering surface 23a (second light-entering surface) on which a red light beam emitted from the red LED 10a is irradiated. In addition, the tapered rod integrator 23 reduces the dispersion angle of the red light beam entering thereto, and then emits the red light beam to the reflection mirror 17b.

The tapered rod integrator 24 includes a light-entering surface 24a (first light-entering surface) on which a green light beam emitted from the green LED 10b is irradiated. In addition, the tapered rod integrator 24 reduces the dispersion angle of the green light beam entering thereto, and then emits the green light beam to the dichroic prism 18.

The tapered rod integrator 25 includes the light-entering surface 25a (first light-entering surface) on which a blue light beam emitted from the green LED 10b is irradiated. In addition, the tapered rod integrator 25 reduces the dispersion angle of the blue light beam entering thereto, and then emits the blue light beam to the reflection mirror 17a.

It should be noted that the aforementioned tapered rod integrators 23 to 25 has the same configuration including the area of the light-entering surface and of the light-emitting surface, the angle of the reflection surface, and the like. Furthermore, the tapered rod integrators 23 to 25 constitute an optical unit in this embodiment.

The reflection mirror 17a reflects a blue light beam emitted from the tapered rod integrator 25 towards the cross dichroic prism 18. The reflection mirror 17b reflects a red light beam emitted from the tapered rod integrator 23 towards the cross dichroic prism 18.

The cross dichroic prism 18 includes a dichroic surface that reflects a red light beam and a blue light beam, and that transmits a green light beam. In addition, the cross dichroic prism 18 leads the red, green and blue light beams, respectively emitted from the tapered rod integrators 28 to 25, to the display panel 30.

The descriptions of the display panel 30 and the projection lens unit 110 are omitted here since the configurations of these components are same as those of the display panel 80 and the projection lens unit 110 of the first embodiment.

Effects and Advantages

According to the projection display apparatus 100 of the present embodiment, the illumination apparatus 120 is configured so that the distance from the arrangement surface F2, on which the red LED 10a is arranged, to the light-entering surface 23a can be longer than the distance "d" from the arrangement surface F3 (or F4), on which the green LED 10b (or the blue LED 10c) is arranged, to the light-entering surface 24a (or the light-entering surface 25a) by the amount of distance "Δd."

Thereby, the illumination apparatus 120 suppresses the portion of a light beam emitted from the red LED 10a, the portion having a large dispersion angle, from entering the light-entering surface 21a. Specifically, in the illumination apparatus 120, a difference between the dispersion angle distribution of the red light beam, emitted from the red LED 10a, and the dispersion angle distribution of the green light beam and the blue light beam, emitted respectively from the green LED 10b and the blue LED 10c, is reduced. Then, the light beams of the colors enter the light-entering surfaces 23a to 25a of the tapered rod integrators 23 and 25, respectively. Then, in the illumination apparatus 120, the tapered rod integrators 23 to 25 irradiate, via the reflection mirrors 17a and 17b and the cross dichroic prism 18, on the display panel 30, the light beams of the colors in which the difference between the dispersion angle distributions is reduced.

According to the projection display apparatus 100, the occurrence of color shading in a projected image can be suppressed while a plurality of solid-state light sources (red LED 10a, green LED 10b and blue LED 10c) having different directivities are used.

Fifth Embodiment

Figure 13B:
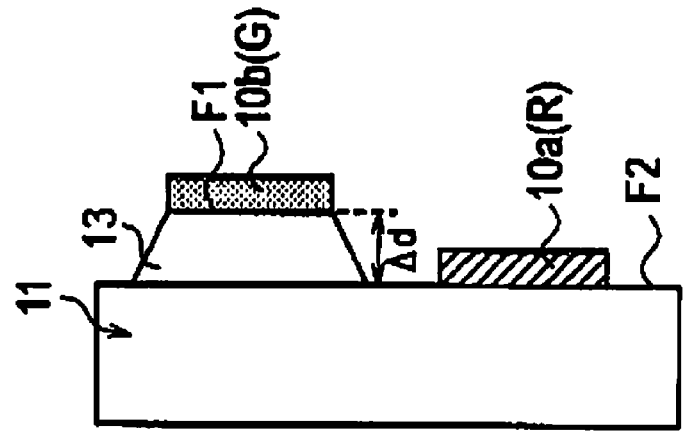
FIG. 13B is a side view showing the configuration of the light source 10 according to the fifth embodiment.
Figure 13A:
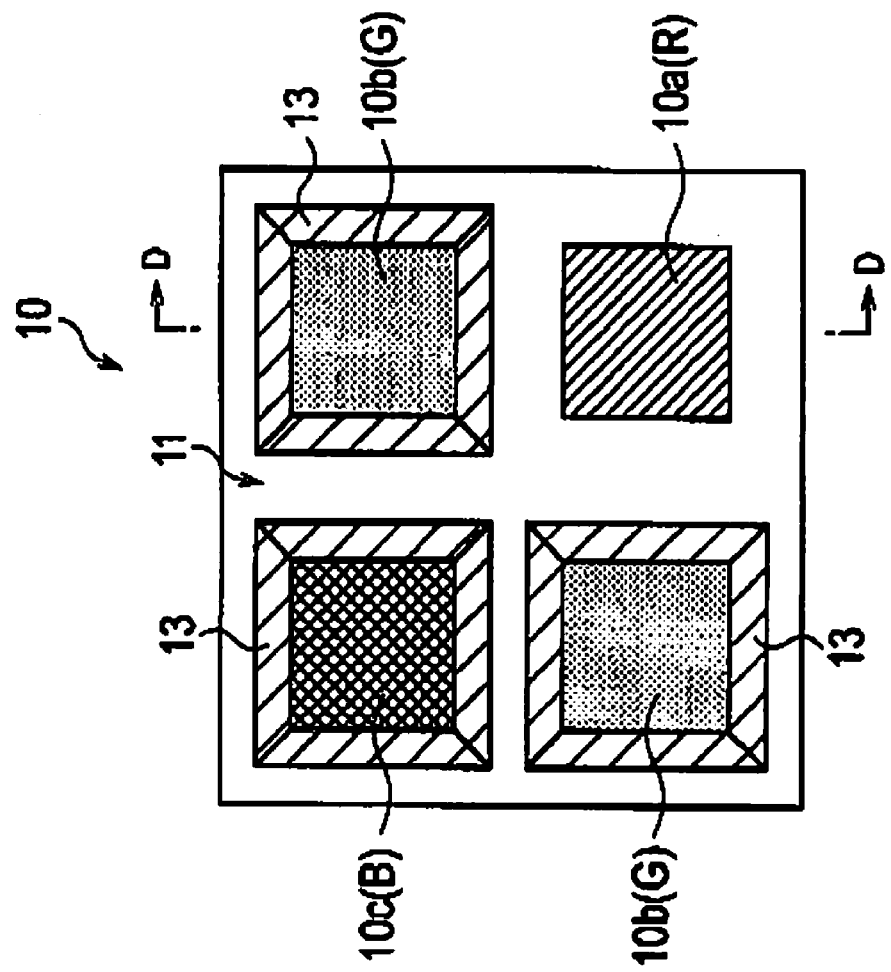
FIG. 13A is a front view showing a configuration of a light source 10 according to a fifth embodiment.

Hereinafter, a description will be given of a light source 10 according to a fifth embodiment while a difference from the first embodiment is in focus. FIG. 13A shows a front view of the light source 10 according to the fifth embodiment being viewed from the tapered rod integrator 21 side. FIG. 13B shows a cross-sectional view taken along the line D-D of the front view shown in FIG. 13A.

As shown in FIGS. 13A and 13B, the core board member 11 includes a base portion 13 provided with the arrangement surface F1 as the top surface of the base portion 13. The base portion 13 is provided on the arrangement surface F2 of the core board member 11. The distance from the bottom surface to the top surface of the base portion 18 is equivalent to the aforementioned amount of distance "Δd."

Similar to the case of the first embodiment, the green LED 11b is arranged on the arrangement surface F1. The red LED 11a is arranged on the arrangement surface F2. Accordingly, the distance from the arrangement surface F2 to the tapered rod integrator light-entering surface) is longer than the distance from the arrangement surface F1 to the tapered rod integrator light-entering surface).

It should be noted that the mechanism used to suppress a light beam (a portion of a red light beam) having a large dispersion angle from entering the tapered rod integrator is the same as that of the first embodiment. Note that, an inclined surface of the base portion 13 may be configured of a reflection surface.

Effects and Advantages

According to the fifth embodiment, the distance from the arrangement surface F2 to the tapered rod integrator (light-entering surface) is longer than the distance from the arrangement surface F1 to the tapered rod integrator light-entering surface). Thus, the same effect as that of the first embodiment can be obtained.

Sixth Embodiment

Hereinafter, a description will be given of a light source 10 according to a sixth embodiment while a difference from the fifth embodiment is in focus. FIG. 14A shows a front view of the light source 10 according to the sixth embodiment being viewed from the tapered rod integrator 21 side. FIG. 14B shows a cross-sectional view taken along the line E-E of the front view shown in FIG. 14A.

As shown in FIG. 14A, the light source 10 includes a plurality of red LEDs 10a, a plurality of green LEDs 10b, a plurality of blue LEDs 10c, and a core board member 11.

It should be noted herein that the directivities of the light beams emitted from the respective LEDs include the following relationships. Specifically, the relationships of the directivities of the light beams of the respective colors can be described that the directivity of a red light beam is greater than the directivity of a blue light beam, and then, the directivity of the blue light beam is greater than the directivity of a green light beam.

As shown in FIGS. 14 and 14B, the core board member 11 includes base portions 13a each provided with the arrangement surface F1 as the top surface of the corresponding base portion 13a, and base portions 13b each provided with the arrangement surface F3 as the top surface of the corresponding base portion 13b. The base portions 13a and 13b are provided on the arrangement surface F2 of the core board member 11. The distance from the bottom surface of to the top surface of each of the base portions 13a is "Δd1" (aforementioned "Δd"), and the distance from the bottom surface of to the top surface of the base portion 13b is Δd2(<Δd1).

Specifically, the distance from the arrangement surface Fr to the tapered rod integrator (light-entering surface) is longer than the distance from the arrangement surface F1 to the tapered rod integrator (light-entering surface). The distance from the arrangement surface F2 to the tapered rod integrator eight-entering surface) is longer than the distance from the arrangement surface F3 to the tapered rod integrator eight-entering surface).

It should be noted that the mechanism used to suppress a light beam (a portion of a red light beam) having a large dispersion angle from entering to the tapered rod integrator is the same as that of the first embodiment.

Effect and Advantage

According to the sixth embodiment, since the distance from the bottom surfaces of to the top surfaces of the respective base portions are different in accordance with the corresponding directivities of the respective LEDs, a portion of a light beam having a large dispersion angle is suppressed from entering the tapered rod integrator for each of the light beams of the respective colors.

Seventh Embodiment

Figure 15B:
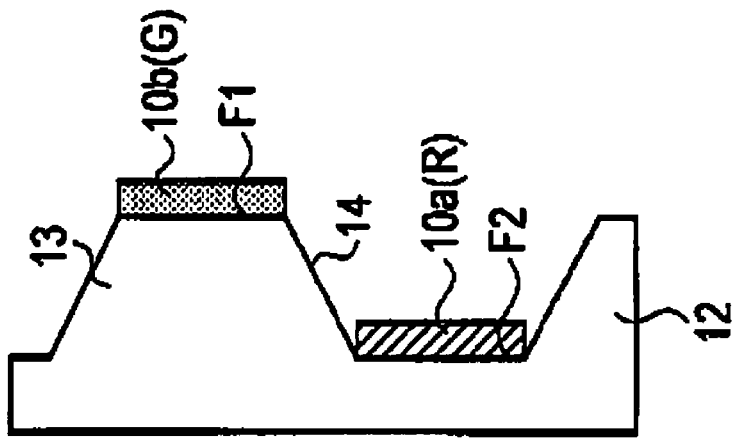
FIG. 15B is a side view showing the configuration of the light source 10 according to the seventh embodiment.
Figure 15A:
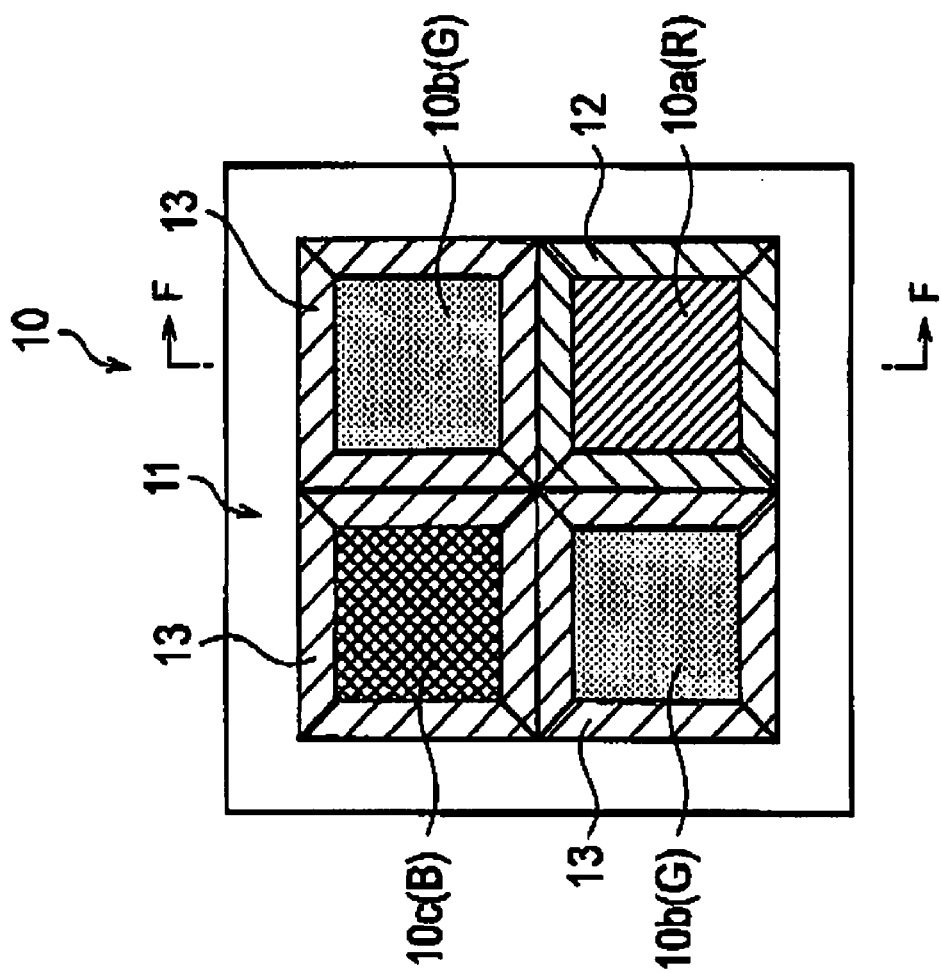
FIG. 15A is a front view showing a configuration of a light source 10 according to a seventh embodiment.

Hereinafter, a description will be given of a light source 10 according to a seventh embodiment while a difference from the first and the fifth embodiments are in focus. FIG. 15A shows a front view of the light source 10 according to the seventh embodiment being viewed from the tapered rod integrator 21 side. FIG. 15B shows a cross-sectional view taken along the line F-F of the front view shown in FIG. 15A.

As shown in FIGS. 15A and 15B, the core board member 11 includes the dent portion 12 provided with the arrangement surface F2 as the bottom surface of the dent portion 12, and the base portion 13 provided with the arrangement surface F1 as the top surface of the base portion 13. In the core board member 11, the dent portion 12 and the base portion 13 are arranged next to each other so that an inclined surface 14 of the base portion 13 can be also regarded as an inclined surface of the dent portion 12. Specifically, the inclined surface of the base portion 13 and the inclined surface of the dent portion are continuous. The distance from the bottom surface (arrangement surface F2) of the dent portion 12 to the top surface (arrangement surface F1) of the base portion 13 in the horizontal direction in FIG. 15B corresponds to the aforementioned amount of distance "Δd."

As in the case of the first embodiment, the green LED 11b is arranged on the arrangement surface F1. The red LED 11a is arranged on the arrangement surface F2. Accordingly, the distance from the arrangement surface F2 to the tapered rod integrator tight-entering surface) is longer than the distance from the arrangement surface F1 to the tapered rod integrator (light-entering surface).

It should be noted that the mechanism used to suppress a light beam (a portion of a red light beam) having a large dispersion angle from entering the tapered rod integrator is the same as that of the first embodiment.

Effects and Advantages

According to the seventh embodiment, the distance from the arrangement surface F2 to the tapered rod integrator (light-entering surface) is longer than the distance from the arrangement surface F1 to the tapered rod integrator tight-entering surface). The same effects as those in the case of the first embodiment can be thus obtained.

Modification Example

A modification example of the aforementioned seventh embodiment will be described. In the aforementioned seventh embodiment, the inclined surface of the dent portion 12 (specifically, the in Mined surface 14 of the base portion 13) may be configured of a reflection surface as shown in the second embodiment.

Eighth Embodiment

Figure 16:
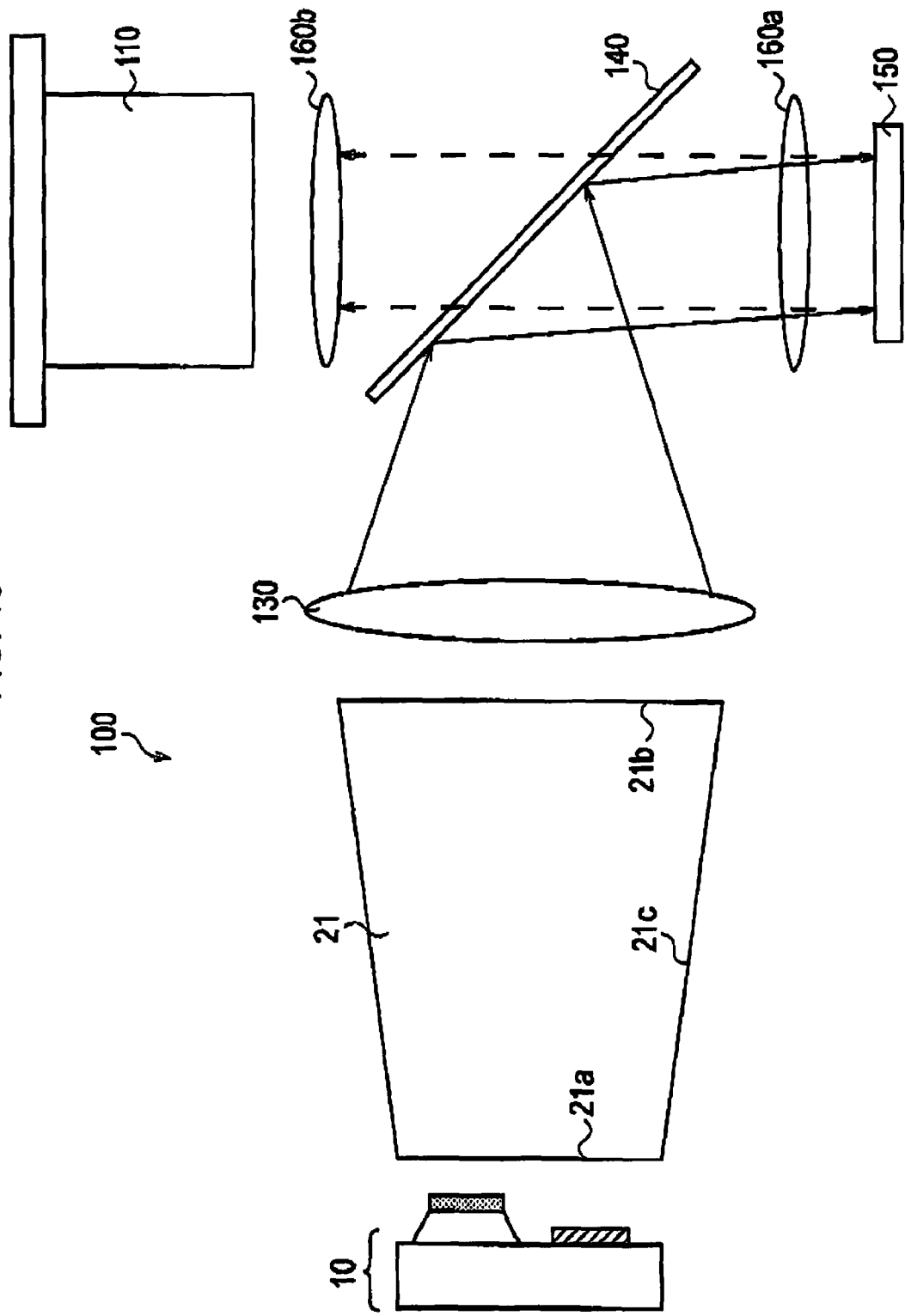
FIG. 16 is a diagram showing a projection display apparatus 100 according to an eighth embodiment.

Hereinafter, a projection display apparatus according to an eighth embodiment will be described. FIG. 16 is a diagram showing the projection display apparatus according to the eighth embodiment. It should be noted that, in FIG. 16, the same components as those described in FIG. 4 are denoted by the same reference numerals.

As shown in FIG. 16, the projection display apparatus 100 includes the light source 10, the tapered rod integrator 21, a lens 130, a reflection mirror 140, a DMD 160, lenses 160a and 160b, and a projection lens 110.

The lens 130 is a lens configured to condense light emitted from the tapered rod integrator 21 to the DMD 150.

The reflection mirror 140 a light beam emitted from the tapered rod integrator 21 towards the DMD 150. Note that, although the reflection mirror 140 is arranged on an optical path of the light beam emitted from the tapered rod integrator 21, the reflection mirror 140 is not arranged on an optical path of the light beam (effective light beam) reflected by the DMD 150.

The DMD 150 is a digital micromirror device (DMD) configured of a plurality of fine mirrors. The angles of the respective fine mirrors are adjusted in accordance with an image input signal. The light beam reflected by the DMD 150 is leaded to the projection lens unit 110 without passing though the reflection mirror 140.

The lenses 160a and 160b condense, in the direction towards the projection lens 110, the light reflected by the DMD 150.

Here, it should be noted that the configuration and arrangement of the light source 10 is the same as those of any one of the aforementioned first to sixth embodiments. In addition, except for the configuration and arrangement of the light source 10, the configuration of the projection display apparatus 100 is same as a general configuration.

Other Embodiments

As described above, the content of the present invention is disclosed through the embodiments of the present invention. The descriptions and drawings that constitute a part of this disclosure, however, should not be understood as to limit the scope of the present invention. For those who are skilled in the art, various alternative embodiments will be apparent from this disclosure.

In the aforementioned third and fourth embodiments, the light source 10_2 is configured to include the dent portion 12 in the illumination apparatus 120. The light source 10_2, however, can be simply arranged, without including the dent portion 12 in the illumination apparatus 120, at a position apart from the light-entering surface 23a of the tapered rod integrator 23 by the amount of distance "Δd" as compared with a different light source.

Moreover, the descriptions are given of the case, as an example, where the light source 10 includes the red LED 10a, which emits a red light beam, and the green LED 10b and the blue LED 10c, which respectively emit a green light beam and a blue light beam, in the aforementioned first to fourth embodiments. The colors of light beams, however, are not limited to these colors.

In addition, the descriptions are given with an LED (light emitting diode) as an example of a solid-state light source in the aforementioned first to fourth embodiments. Various light sources, however, can be applied to the illumination apparatus 120. Specifically, the present invention can be applied to an illumination apparatus including various solid-state light sources each having a different directivity.

The tapered rod integrator can be a solid-core rod configured of a transparent member, such as glass, or a hollow rod surrounded by mirror surfaces.

The solid-state light sources are not limited to the LEDs. The solid-state light sources may be LDs (laser diodes).

The configurations of the embodiments and modification examples can be combined. In addition, the effects and advantages of the respective embodiments and modification examples are merely listed as the most preferable effect and advantage generated from the present invention. Accordingly, the effects and advantages of the present invention are not limited to the ones described in the embodiments. As described, the present invention includes various embodiments not listed in this description as a matter of course. Accordingly, the technical scope of the present invention is defined by the matters to define the invention according to the scope of claims which are reasonably understood from the aforementioned descriptions.

What is claimed is:

1. An illumination apparatus comprising:
   a first solid-state light source configured to emit a light beam having a first directivity;
   a second solid-state light source configured to emit a light beam having a second directivity greater than the first directivity;
   a first arrangement member provided with a first arrangement surface on which the first light source is arranged;
   a second arrangement member provided with a second arrangement surface on which the second light source is arranged; and
   an optical unit configured to reduce a dispersion angle of the light beam emitted from the first solid-state light source and the light beam emitted from the second solid-state light source, wherein
   a wave length of the light beam emitted from the first solid-state light source is different from a wave length of the light beam emitted from the second solid-state light source,
   the optical unit is provided with a first light-entering surface on which the light beam emitted from the first solid-state light source is irradiated, and a second light-entering surface on which the light beam emitted from the second solid-state light source is irradiated,
   the first arrangement surface faces the first light-entering surface, and the second arrangement surface faces the second light-entering surface, and
   a distance from the second arrangement surface to the second light-entering surface is longer than a distance from the first arrangement surface to the first light-entering surface.

2. The illumination apparatus according to claim 1, wherein the second arrangement member includes a dent portion having a bottom surface as the second arrangement surface.

3. The illumination apparatus according to claim 2, wherein an inclined surface of the dent portion is formed of a reflection surface which reflects, towards the second light-entering surface, the light beam emitted from the second solid-state light source.

4. The illumination apparatus according to claim 1, wherein the first arrangement member includes a base portion having a top surface as the first arrangement surface.

5. The illumination apparatus according to claim 1, wherein
   the optical unit is a single optical element including the first light-entering surface and the second light-entering surface as a same light-entering surface, and
   the first arrangement member and the second arrangement member are formed as an integrated single component.

6. The illumination apparatus according to claim 1, wherein the first solid-state light source and the second solid-state light source include a plurality of solid-state light sources, respectively.

7. The illumination apparatus according to claim 1, wherein
   the optical unit is a single optical element including the first light-entering surface and the second light-entering surface as the same light-entering surface,
   the first arrangement member includes a base portion having a top surface as the first arrangement surface,
   the second arrangement member includes a dent portion having a bottom surface as the second arrangement surface,
   the first arrangement member and the second arrangement member are arranged next to each other, so that an inclined surface of the base portion forms an inclined surface of the dent portion, and
   the inclined surface of the base portion is formed of a reflection surface which reflects, to the second light-entering surface, the light beam emitted from the second solid-state light source.

8. A projection display apparatus comprising:
   the illumination apparatus according to claim 1;
   a light valve configured to modulate a light beam irradiated form the illumination apparatus, and
   a projection lens configured to project, onto a screen, the light beam modulated by the light valve.

* * * * *